US008615448B1

(12) United States Patent
O'Twomney et al.

(10) Patent No.: US 8,615,448 B1
(45) Date of Patent: Dec. 24, 2013

(54) SYSTEM, METHOD, AND COMPUTER READABLE MEDIUM FOR FACILITATING STYLIST PROVIDED RECOMMENDATIONS

(75) Inventors: Jennifer R. O'Twomney, Seattle, WA (US); Maren Marie Costa, Seattle, WA (US); Aaron M. Donsbach, Seattle, WA (US); Marina A. Pai, Issaqua, WA (US); Sean M. Scott, Sammamish, WA (US); Devraj Varadhan, Bellevue, WA (US); Anoop Balakrishnan, Seattle, WA (US); Ryuichi Hirano, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 22 days.

(21) Appl. No.: 13/172,444

(22) Filed: Jun. 29, 2011

(51) Int. Cl.
*G06Q 30/00* (2012.01)
(52) U.S. Cl.
USPC ...................................... 705/26.7; 705/26.44
(58) Field of Classification Search
USPC .............................................. 705/26.1–27.2
See application file for complete search history.

(56) References Cited

U.S. PATENT DOCUMENTS

| 6,901,379 | B1* | 5/2005 | Balter et al. ................. 705/27.2 |
| 2003/0065578 | A1* | 4/2003 | Peyrelevade et al. .......... 705/26 |
| 2005/0027612 | A1* | 2/2005 | Walker et al. .................. 705/26 |
| 2005/0256733 | A1* | 11/2005 | Nagai et al. ...................... 705/1 |
| 2006/0218046 | A1* | 9/2006 | Carfi et al. ..................... 705/26 |
| 2008/0103913 | A1* | 5/2008 | Leach et al. ................... 705/26 |
| 2010/0265311 | A1* | 10/2010 | Carpenter et al. ......... 348/14.08 |
| 2011/0137744 | A1* | 6/2011 | Schwankl et al. ........... 705/26.8 |
| 2012/0284099 | A1* | 11/2012 | Dixon ....................... 705/14.16 |

OTHER PUBLICATIONS www.searchhairstylist.com. From Feb. 13, 2009 to Jan. 30, 2011. [recovered from www.Archive.org].*

* cited by examiner

*Primary Examiner* — William Allen
(74) *Attorney, Agent, or Firm* — Thomas Horstemeyer, LLP (57) ABSTRACT

Disclosed are various embodiments relating to generating profile-based item suggestions from a stylist when purchasing items through an electronic commerce system. A network page is rendered in a client computing device comprising an input field to input descriptions of items the user wishes to purchase and a stylist profile selection mechanism to select a suggested stylist profile. The user inputs descriptions of items and selects the suggested stylist profile. An item suggestions request comprising the item descriptions and the selected stylist profile is sent from the client computing device to a server computing device.

22 Claims, 7 Drawing Sheets

SYSTEM, METHOD, AND COMPUTER READABLE MEDIUM FOR FACILITATING STYLIST PROVIDED RECOMMENDATIONS

BACKGROUND

People often purchase clothing items and accessories online in their own homes. However, often times they are not able to receive suggestions or advice from experienced stylists.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to generating profile-based item suggestions from a stylist when purchasing clothing, accessories, or other items through an electronic commerce system. A user with a user account with one or more profiles may wish to obtain suggestions from a stylist about potential purchases. To do so, the user may generate an item suggestions request by selecting a profile, creating a shopping list comprising various items the user wishes to purchase, and selecting a stylist. In response to the item suggestions request, the stylist may provide suggestions for various items for the user to purchase. In the following discussion, a general description of the system and its components is provided, followed by a discussion of the operation of the same.

Figure 1:
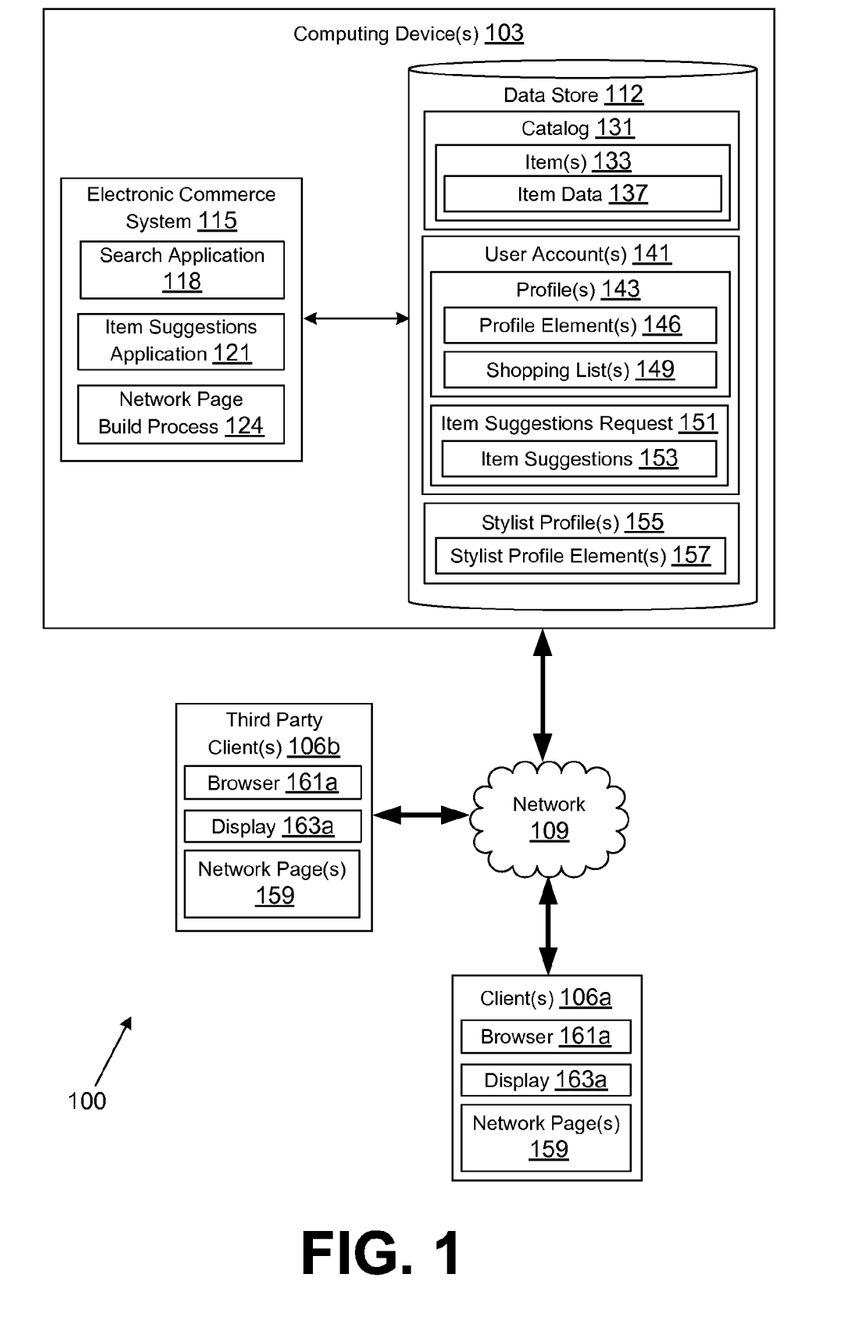
FIG. 1 is a drawing of networked environment according to various embodiments of the present disclosure.

With reference to FIG. 1, shown is a networked environment 100 according to various embodiments. The networked environment 100 includes a computing device 103, clients 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include an electronic commerce system 115 and other applications, services, processes, systems, engines, or functionality not discussed in detail herein. The electronic commerce system 115 includes various components such as a search application 118, an item suggestions application 121, a network page build process 124, and other applications and/or processes.

The electronic commerce system 115 is executed in order to facilitate the online purchase of items 133, such as, goods and/or services, over the network 109. The electronic commerce system 115 also performs various back-end functions associated with the online presence of a merchant in order to facilitate the online purchase of items 133 as will be described. For example, the electronic commerce system 115 may generate various network pages 159, such as web pages, or other types of network content, using the network page build process 124, that are provided to clients 106 for the purposes of selecting items 133 for purchase, rental, download, lease, or other form of consumption as will be described. The electronic commerce system 115 further includes a search application 118 and/or other applications useful to facilitate electronic commerce.

The item suggestions application 121 generates one or more network pages 159 in order to obtain item suggestions from one or more stylists. Associated with each stylist are one or more stylist profiles as will be described. The item suggestions application 121 may also generate one or more additional network pages 159 to view item suggestions from stylists as discussed below.

The data stored in the data store 112 includes, for example, a catalog 131 of items 133, user accounts 141, stylist profiles 155, and potentially other data. The catalog 131 includes a listing of items 133 that are described by item data 137 and offered for sale by an online merchant. As used herein, the term "item" 133 may refer to a product, good, service, bundle of products, goods and/or services that may be offered for sale, purchase, rental, lease, download, and/or any other form of consumption, as can be appreciated. The item data 137 describes each of the items 133 and may comprise, for example, titles, descriptions, quantities, images, representations, options, weights, customer reviews, customer ratings, keywords, tags, shipping restrictions, prices, tax classifications, categories, unique identifiers, and any other data related to items 133. In one embodiment, the electronic commerce system 115 may include a catalog taxonomy to aid in searching various items 133 as will be described.

Each user account 141 is associated with a respective user and may include a shipping address, an electronic mail (e-mail) address, shipping information, payment information, a purchasing history, a browsing history, and other data related to the user. In addition, each of the user accounts 141 may comprise one or more profiles 143 created by the user. In one embodiment, each of the profiles 143 is associated with, or describes, for example, a role of a given user and may comprise profile elements 146 that may include text, images, ratings, scores, and potentially other data that makes up the profile 143. In another embodiment, each of the profiles 143 may include a shopping list 149 created by the user comprising a list of items 133 the user would like to purchase.

Additionally, from time to time an item suggestions request 151 may be created by a user in order to obtain item suggestions 153 from a stylist associated with a stylist profile 155 as will be described. In one embodiment, the item suggestions request 151 and the item suggestions 153 may be stored in association with a user account 141.

Each stylist profile 155 is associated with a stylist that may provide personal shopping services, such as, for example, identifying items 133 the user may want to purchase, reviewing a user's wardrobe, and potentially other services. Each stylist profile 155 may comprise stylist profile elements 157 that may include text, images, ratings, scores, and potentially other data that describes the qualifications of the stylist. In one embodiment, a stylist associated with a stylist profile 155 may upload a portfolio comprising a collection of images that showcase the talents of the stylist in the field of personal shopping as will be described.

In one embodiment, various automated mechanisms may be employed to approve stylists that wish to create a stylist profile 155. For example, a stylist may submit a portfolio and other information regarding their fashion experience and expertise. Thereafter, the stylist's portfolio may be reviewed and approved in order for a stylist to post a stylist profile 155 for users to select as will be described.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser 161 and/or other applications. The browser 161 may be executed in a client 106 for example, to access and render network pages 159, such as, web pages, or other network content served up by the computing device 103 and/or other servers. Alternatively, a mobile application may be executed in a client 106 to generate and render user interfaces using data served up by the computing device 103 and/or other servers. In addition, when rendered, the network pages 153 generate a user interface as can be appreciated. The client 106 may be configured to execute applications beyond the browser 161 such as, for example, email applications, instant message applications, and/or other applications.

When executed in a client 106, the browser 161 renders network pages 159 on a respective display 163 and may perform other functions. The browser 161 accesses network pages 159, such as web pages or other types of content from the computing device 103 in order to access the functionality of the search application 118, and other components implemented in the computing device 103 as will be described.

Next, a general description of the operation of the various components of the networked environment 100 is provided. To begin, assume a user of a client 106*a* has a user account 141 with a merchant and would like to create one or more profiles 143 comprising profile elements 146. To do so, the user may navigate to one or more network pages 159 served up by the electronic commerce system 115 to facilitate the input of profile elements 146 that make up the respective profile 143.

In one embodiment, such network pages 159 may present a questionnaire with text fields for the user to input the profile elements 146. In another embodiment, such network pages 159 may comprise selection mechanisms, such as, for example, pick lists or toggle mechanisms, to facilitate the input of the profile elements 146 by allowing the user to select options or other information that describes the profile 143. In this manner, many users may generate, for example, their own profiles 143 that describe the roles they take on in their daily lives.

After creating one or more profiles 143, a user may wish to generate an item suggestions request 151 in association with a profile 143. After selecting a profile 143 from a profile selection mechanism, the user of the client 106*a* navigates to one or more network pages 159 that facilitate creating a shopping list 149 and selecting a stylist associated with a respective stylist profile 155.

To create a shopping list 149, the network page 159 may comprise, for example, an input field to input descriptions of one or more items 133 and a photo field to upload photos of one or more items 133. To select a stylist profile 155, the network page 159 may further comprise, for instance, one or more search mechanisms to select search terms used to search stylist profile elements 157 of various stylist profiles 155 as described below.

For example, in association with a "Work" profile 143, a user may input "comfortable black shoes for work" into the input field and select the search terms "Casual Chic" and "Female" from the search mechanisms. In this example, the user is seeking a female stylist, specializing in shopping for casual chic apparel, to assist the user in finding comfortable black shoes to wear to work.

In the example above, the item suggestions application 121 may, in one embodiment, be configured to use the search terms to search stylist profile elements 157 that identify one or more stylist profiles 155 associated with stylists that are female and specialize in casual chic styling. The item suggestions application 121 may generate one or more network pages 159 showing one or more identified stylist profiles 155. The user may then navigate through the network pages 159 and select a stylist profile 155 to assist the user as described below.

In another embodiment, the network page 159 configured to generate an item suggestions request 151 may comprise one or more stylist profile selection mechanisms to select one or more suggested stylist profiles 155. The user may then select the stylist profile selection mechanism corresponding to the stylist profile 155 the user would like to use to assist in finding items 133 in the user's shopping list 149.

For example, a user may have created a "Work" profile 143 and selected the option entitled "Full Figure" from a pick list to describe the body type of the "Work" profile 143, the option entitled "Young Professional" from a pick list describing the life stage of the "Work" profile 143, thereby creating profile elements 149. In this example, the item suggestions application 121 may be configured to use the profile elements 149 entitled "Full Figure" and "Young Professional" of the user's "Work" profile 143 as search terms to search stylist profile elements 157 that identify one or more stylist profiles 155 associated with stylists that specialize in dressing full figure women in professional business attire.

In yet another embodiment, the network page 159 may comprise input fields that allow a user to specify a budget for each item 133 in the shopping list 149. For example, a user may input "No more than $100.00" in association with an item 133 to inform a stylist the user does not want to view item suggestions 153 for items 133 that cost more than $100.00.

After creating a shopping list 149 and selecting a stylist profile 155, as described above, the user may then send the item suggestions request 151 to the computing device 103 through network 109 by clicking on an appropriate button or link. Thereafter, the item suggestions application 121 may then queue up the item suggestions request 151 to the stylist associated with the stylist profile 155 on a third party client 106b through network 109. The stylist on the third party client 106b may then accept the item suggestions request 151. After viewing the user's shopping list 149, the stylist may then navigate through various network pages 159 to submit item suggestions 153.

Specifically, the item suggestions application 121 may encode for display one or more network pages 159 that are sent to the third party client 106b through the network 109 to facilitate the input of item suggestions 153. The item suggestions 153 from the stylist may comprise text, images, opinions, and any other feedback to assist the user in finding items 133 described in the user's shopping list 149.

Thereafter, the user may wish to view the item suggestions 153. To do so, the user of the client 106a may navigate through one or more network pages 159 to view the item suggestions 153. In one embodiment, the network pages 159 comprising the item suggestions 153 may further comprise comment fields. To this end, a user may input a comment in the comment field to provide feedback to the stylist. In addition, the network page 159 may also comprise a link to communicate with the stylist. The item suggestions application 121 may store the item suggestions 153 obtained from a stylist in association with a user account 141 in the data store 112.

In one embodiment, a user may be notified of an item suggestion 153 from a stylist in a variety of ways, such as, for example, through email, text messaging, notification through a mobile application, and potentially other ways. The notification may comprise the content of the item suggestion 153 or a link to click on in order to view the item suggestions 153.

In one embodiment, an arrangement may be made between stylists and the merchant that sells items 133 through the electronic commerce system 115 to pay a commission for all sales of items 133 generated by item suggestions 153 from a stylist. Such an arrangement serves to drive customers to the electronic commerce system 115 and increase sales.

In another embodiment, after a user has received item suggestions 153 from a stylist, the user may rate the stylist's personal shopping services. For example, the user may rate the stylist's ability to find items 133 in the user's shopping list 149, to communicate effectively with the user, and potentially other information. In addition, the user may be able to input feedback, such as a testimonial, that indicates whether the user would recommend the stylist to other users.

Upon submitting feedback about one or more stylists, a ranking algorithm may be used to generate a stylist rating for the stylist. For instance, the ranking algorithm may average the customer ratings received for a stylist to generate the stylist rating. In one embodiment, the stylist rating may then be posted in association with the stylist profile 155. Such an arrangement serves to improve the quality of services offered by stylists.

In another embodiment, if a user does not like the item suggestions 153 from a stylist, then the user may disengage the services of the stylist. For example, the user may end their relationship with the stylist by withdrawing their shopping list 149. The user may then repost their shopping list 149 and select another stylist profile 155 to assist the user in finding one or more items 133.

Figure 2:
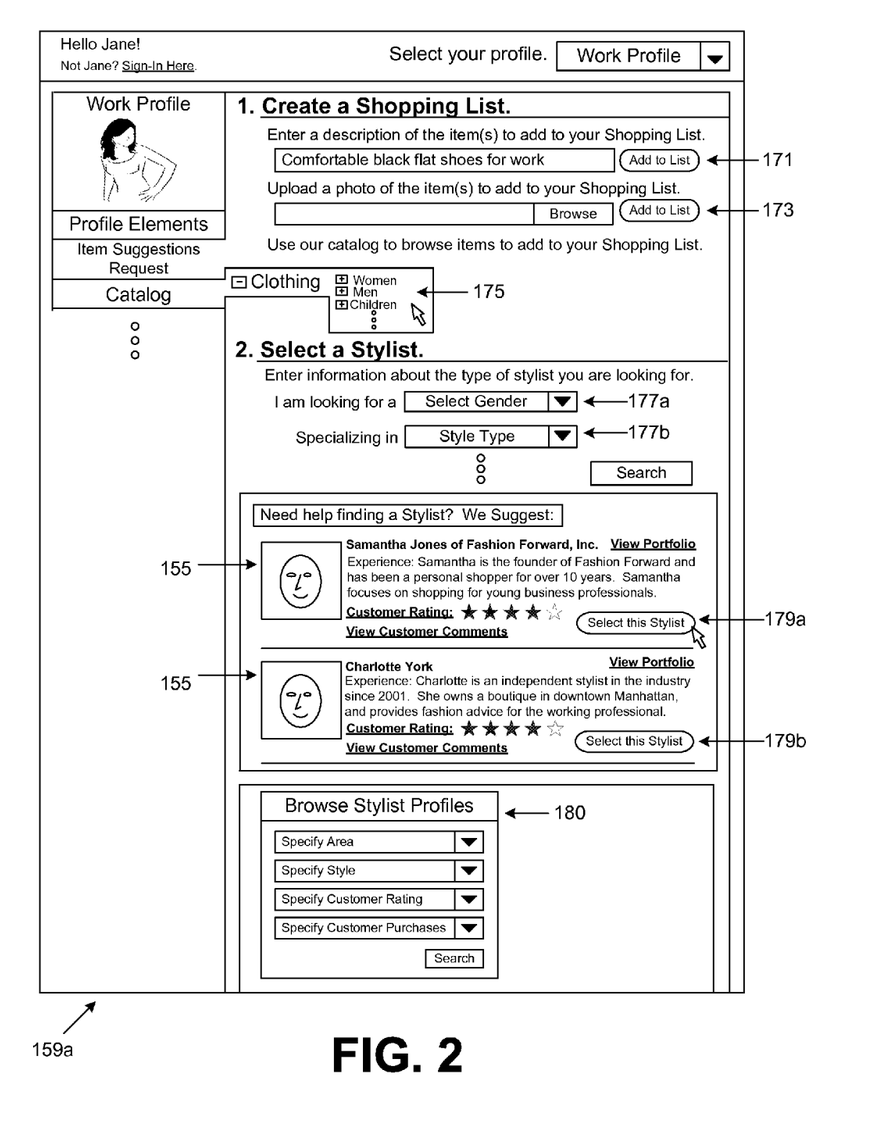
FIGS. 2-4 are diagrams of examples of network pages rendered in a client in the networked environment of FIG. 1 according to various embodiments of the present disclosure.

FIG. 2 illustrates a non-limiting example of a network page 159, denoted herein as network page 159a, configured to generate an item suggestions request 151 (FIG. 1).

As a non-limiting example, in FIG. 2, the network page 159a includes an input field 171, a photo field 173 and catalog taxonomy 175 to facilitate creating a shopping list 149 (FIG. 1) as described above. For example, the user may input a description of an item 133 (FIG. 1) the user wishes to purchase into input field 171. Alternatively, the user may upload one or more photos of an item 133 the user wishes to purchase or the user may search for an item 133 the user wishes to purchase using the catalog taxonomy 175. Additionally, the network page 159a further comprises, for example, search mechanisms 177a, 177b and selection mechanisms 179a, 179b to assist the user in selecting a stylist. For example, search mechanisms 177a, 177b allow the user to select one or more search terms that are used by the item suggestions application 121 (FIG. 1) to search various stylist profiles 155. Alternatively, the user may select a stylist profile 155 suggested by the item suggestions application 121 by selecting the search mechanisms 177a, 177b to select a suggested stylist profile 155 as described above. Lastly, the network page 159a further comprises graphical components 180 to browse various stylist profiles 155. For example, graphical components 180 may allow the user to browse stylist profiles 155 by geographical areas, by styles the stylist specializes, by customer ratings, by items purchased by a user, or other options. For example, a user may select the style option entitled "Plus Size" to browse stylist profiles 155 of stylists who specialize in personal shopping services for full figured women.

As shown in FIG. 2, a user with a "Work" profile 143 inputted "Comfortable black flat shoes for work" into input filed 171 and selected stylist profile selection mechanism 179a to select the stylist profile 155 associated with a stylist named "Samantha Jones" to assist the user in finding comfortable black flat shoes to wear at work.

Figure 3:
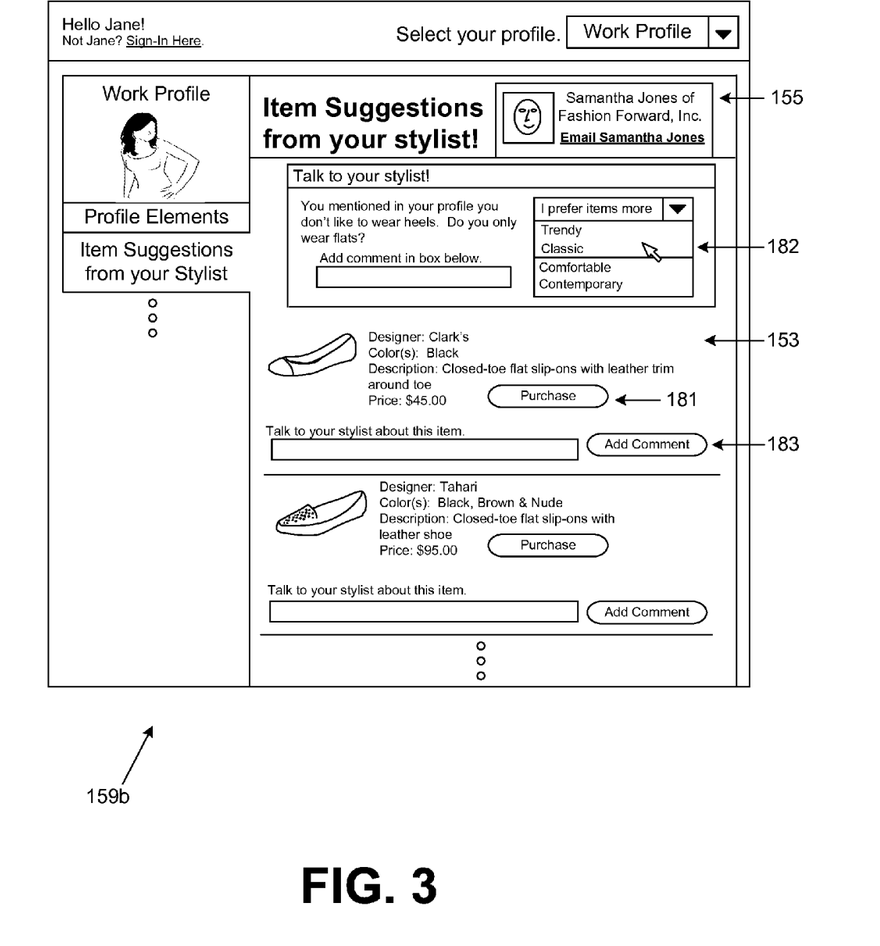

FIG. 3 illustrates a non-limiting example of a network page 159, denoted herein as network page 159b, comprising item suggestions 153 from a stylist associated with a stylist profile 155.

As a non-limiting example, as shown in FIG. 3, the stylist associated with stylist profile 155 (e.g. "Samantha Jones of Fashion Forward, Inc.") has submitted item suggestions 153 in response to an item suggestions request 151 (FIG. 1). The network page 159b may also comprise a feedback field 182 for the user to provide feedback to the stylist. Each of the item suggestions 153 comprises, for example, a description and image of an item 133 (FIG. 1) and a purchase button 181 to facilitate the purchase of the item 133 suggested by the stylist. Additionally, the network page 159b also comprises a comment field 183 for the user to input a comment about the item suggestions 153. In this manner, the user may communicate with the stylist directly if the stylist is not presenting items 133 the user likes or would purchase.

Figure 4:
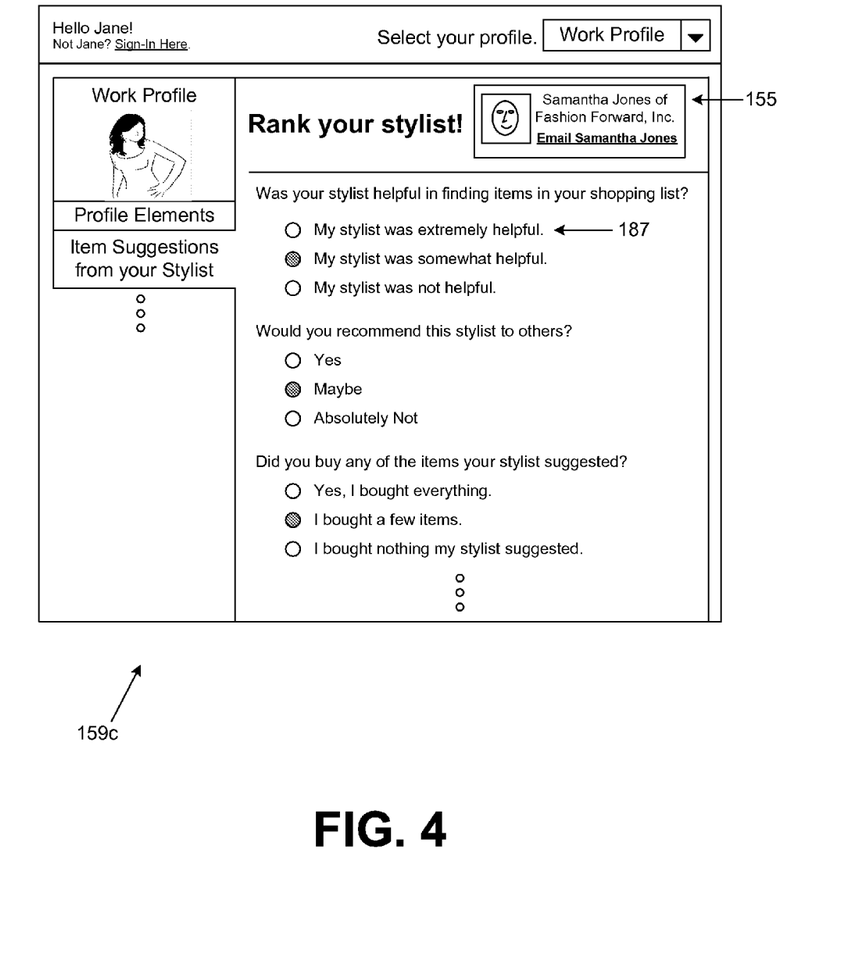

FIG. 4 illustrates a non-limiting example of a network page 159, denoted herein as network page 159c, comprising a questionnaire used to rank a user's experience with a stylist.

As a non-limiting example, in FIG. 4, the network page 159c comprising examples of feedback selection mechanisms 187 to assist the user in rating the personal shopping services of a stylist. The user's response may then be used to generate a customer rating associated with each of the stylists profiles 155 as described above. Alternatively, other types of input mechanisms may be used that differ from those shown, such as, pick lists, toggle mechanisms, and potentially other ways.

Figure 5A:
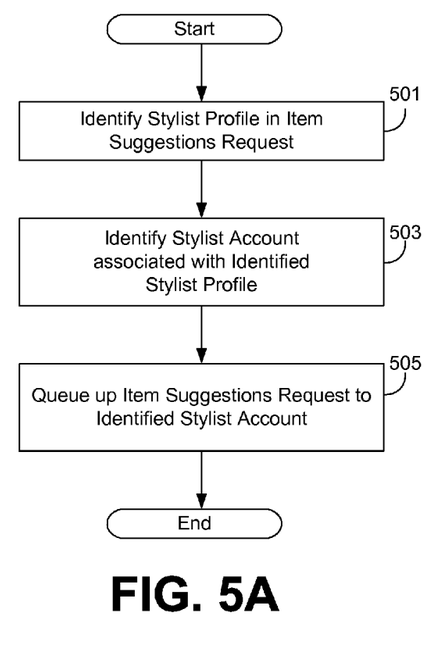
FIGS. 5A, 5B and 6 are flowcharts illustrating examples of the functionality of an item suggestions application executed in a computing device in the networked environment of FIG. 1 according to various embodiments of the present disclosure.

Referring next to FIG. 5A, shown is a flowchart that provides one example of the operation of a portion of the item suggestions application 121 (FIG. 1) according to various embodiments. It is understood that the flowchart of FIG. 5A provides merely an example of the many different types of functional arrangements that may be employed to implement the operation of the portion of the item suggestions application 121 as described herein. As an alternative, the flowchart of FIG. 5A may be viewed as depicting an example of steps of a method implemented in the computing device 103 (FIG. 1) according to one or more embodiments.

To send an item suggestions request 151 (FIG. 1) to a selected stylist, in box 501, the item suggestions application 121 identifies a stylist profile 155 (FIG. 1) specified in an item suggestions request 151. Then, in box 503, the item suggestions application 121 identifies a stylist account associated with the stylist profile 155 identified in box 501. Lastly, in box 505, the item suggestions application 121 queues up the item suggestions request 151 to the stylist account identified in box 503.

Figure 5B:
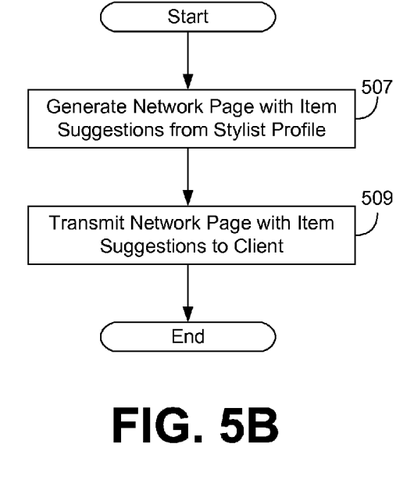

Referring next to FIG. 5B, shown is a flowchart that provides one example of the operation of a portion of the item suggestions application 121 (FIG. 1) according to various embodiments. It is understood that the flowchart of FIG. 5B provides merely an example of the many different types of functional arrangements that may be employed to implement the operation of the portion of the item suggestions application 121 as described herein. As an alternative, the flowchart of FIG. 5B may be viewed as depicting an example of steps of a method implemented in the computing device 103 (FIG. 1) according to one or more embodiments.

To begin, in box 507, the item suggestions application 121 generates one or more network pages 159b (FIG. 3) comprising item suggestions 153 (FIG. 1) from a stylist specified in an item suggestions request 151 (FIG. 1). Then, in box 509, the item suggestions application 121 transmits the item suggestions 151 in the network page 159b to the client 106a (FIG. 1).

Figure 6:
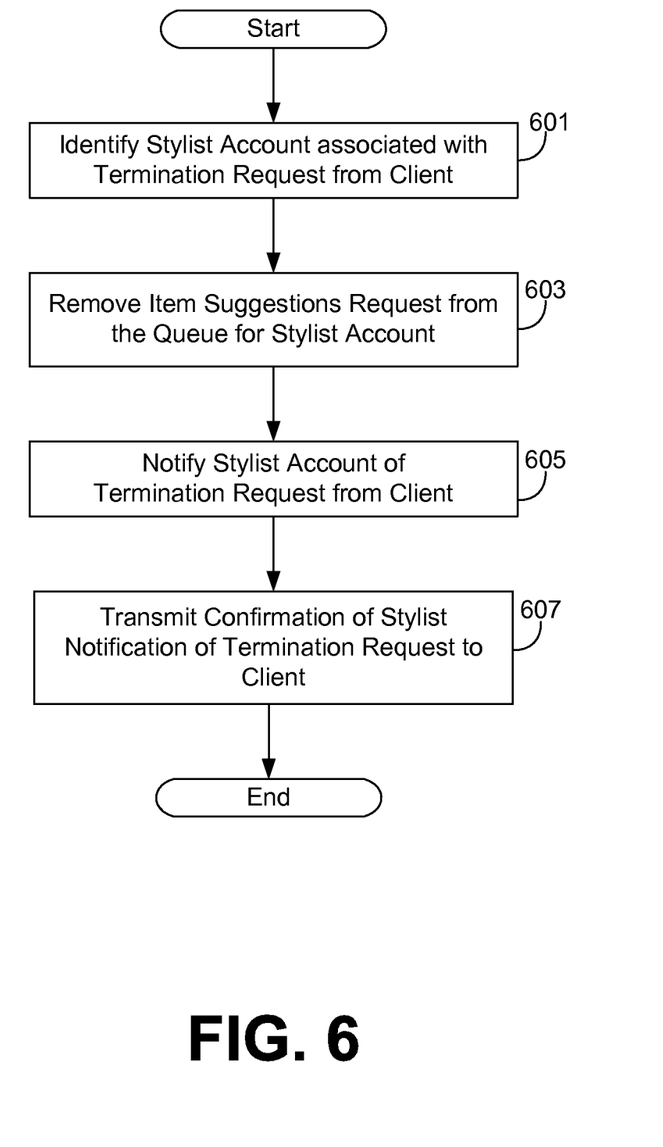

Referring next to FIG. 6, shown is a flowchart that provides one example of the operation of a portion of the item suggestions application 121 (FIG. 1) according to various embodiments. It is understood that the flowchart of FIG. 6 provides merely an example of the many different types of functional arrangements that may be employed to implement the operation of the portion of the item suggestions application 121 as described herein. As an alternative, the flowchart of FIG. 6 may be viewed as depicting an example of steps of a method implemented in the computing device 103 (FIG. 1) according to one or more embodiments.

If a user withdraws a shopping list 149 and no longer wishes to work with a stylist, then the user may navigate to one or more network pages 153 to generate and submit a termination request. Thereafter, in box 601, the item suggestions application 121 identifies a stylist account 155 (FIG. 1) specified in the termination request. Then, in box 603, the item suggestions application 121 removes the item suggestions request from the queue identified in box 505 (FIG. 5). Thereafter, the item suggestions application 121 notifies the stylist associated with the stylist account 155 of the termination request from the client 106 via email, text message, or other medium. Lastly, in box 607, the item suggestions application 121 transmits a confirmation of the notification identified in box 603 to the client 106. If the user wishes to select a new stylist to assist in finding items 133 described in the shopping list 149, then the user may generate a new item suggestions request 151 as described above in FIG. 5A.

Figure 7:
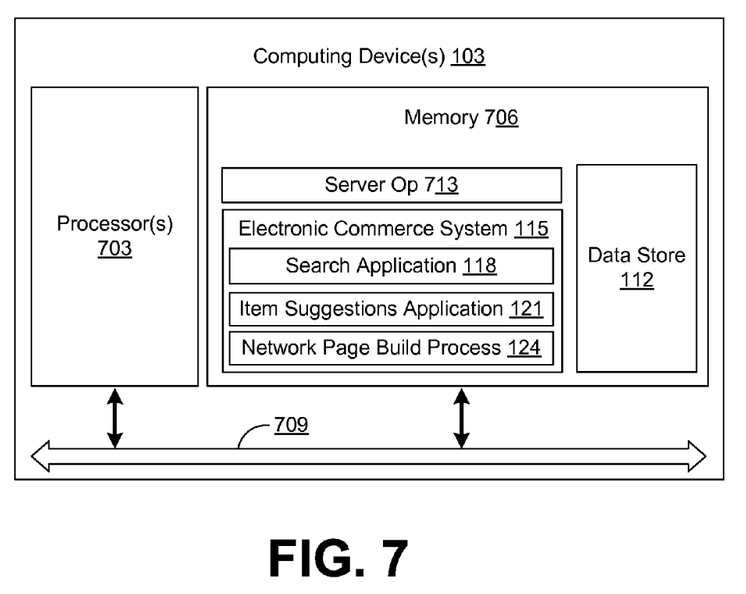
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are an operating system 713, an electronic commerce system 115, a search application 118, an item suggestions application 121, a network build process 124, and potentially other applications. Also stored in the memory 706 may be a data store 112 and other data. In addition, an operating system may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although an electronic commerce system 115, a search application 118, an item suggestions application 121, a network build process 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4A and 4B show the functionality and operation of an implementation of portions of the item suggestions application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4A and 4B show a specific order of execution, it is understood that the order of execution may differ from that which is depicted. For example, the order of execution of two or more blocks may be scrambled relative to the order shown. Also, two or more blocks shown in succession in FIGS. 4A and 4B may be executed concurrently or with partial concurrence. Further, in some embodiments, one or more of the blocks shown in FIGS. 4A and 4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including an electronic commerce system 115, a search application 118, an item suggestions application 121, a network page build process 124, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that identifies a profile associated with a user account;

code that identifies at least one suggested stylist profile of a plurality of stylist profiles associated with a corresponding plurality of stylists based upon predefined criteria;

code that encodes for display at least one first network page configured to generate an item suggestions request, the at least one first network page comprising an input field to input at least one description of a desired item a user wishes to purchase, a plurality of search mechanisms to select at least one search term used to search the plurality of stylist profiles, and at least one stylist profile selection mechanism to select the at least one suggested stylist profile of the plurality of stylist profiles to respond to the item suggestions request, wherein the at least one first network page is sent to a client and configured to generate the item suggestions request;

code that encodes for display at least one second network page to facilitate an input of a plurality of suggestions from a stylist associated with at least one stylist profile of the plurality of stylist profiles selected by the user to respond to the item suggestions request; and encode for display at least one third network page comprising at least one of the suggestions from the stylist associated with the at least one suggested stylist profile of the plurality of stylist profiles selected by the user, wherein the at least one third network page further comprises a purchase button and a comment button depicted in association with each of the at least one of the suggestions from the stylist.

2. The non-transitory computer-readable medium of claim 1, wherein at least one of the suggestions from the stylist included in the at least one third network page relate to at least one item available for purchase through an electronic commerce system.

3. The non-transitory computer-readable medium of claim 2, wherein the plurality of suggestions provide advice in response to the item suggestions request.

4. A system, comprising:
a data store configured to store a plurality of stylist profiles comprising a plurality of stylist elements; and
at least one computing device in communication with the data store, the at least one computing device configured to:
identify at least one suggested stylist profile from the plurality of stylist profiles based upon at least one search term, each of the plurality of stylists profiles comprising the plurality of stylist elements that describe a personal shopping service;
implement a presentation of an input field to input a description of at least one item a user wishes to purchase, a plurality of search mechanisms to select the at least one search term to search the plurality of stylist profiles, and at least one stylist profile selection mechanism to select the at least one suggested stylist profile to respond to an item suggestions request;
encode for display at least one first network page that includes the input field, the plurality of search mechanisms and the at least one stylist profile selection mechanism, wherein the at least one first network page is sent to a client and configured to generate the item suggestions request; and
encode for display at least one second network page comprising at least one suggestion from a stylist associated with the at least one suggested stylist profile selected to respond to the item suggestions request, wherein the at least one second network page further comprises a purchase button and a comment button depicted in association with each one of the at least one suggestion from the stylist.

5. The system of claim 4, wherein the at least one first network page further comprises a plurality of graphical components, the plurality of graphical components used to facilitate a search through the plurality of stylist profiles.

6. The system of claim 4, wherein the at least one computing device is further configured to obtain at least one additional search term from a user profile element of a user profile associated with the user.

7. The system of claim 6, wherein the at least one computing device is further configured to use the at least one additional search term to identify the at least one suggested stylist profile.

8. The system of claim 4, wherein the at least one computing device is further configured to send the at least one second network page comprising the at least one suggestion to the client.

9. The system of claim 4, wherein the at least one suggestion is stored in association with a user account.

10. The system of claim 9, wherein the at least one item is stored in association with the user account.

11. The system of claim 10, wherein the at least one suggestion identifies the at least one item in a catalog to suggest to the user in response to the item suggestions request.

12. The system of claim 11, further comprising an application executed, in the at least one computing device, to authenticate the user associated with the user account.

13. The system of claim 4, wherein the stylist further comprises a plurality of stylists, and the at least one computing device is further configured to:
store a plurality of customer ratings associated with the plurality of stylist profiles, each of the plurality of customer ratings comprising a numerical value representing a quality of a service offered by a respective one of the plurality of stylists associated with a corresponding one of the plurality of stylist profiles; and
generate a plurality of stylist ratings, each of the plurality of stylist ratings being associated with a corresponding one of the plurality of stylist profiles, and each of the plurality of stylist ratings comprises an average of a subset of the plurality of customer ratings associated with a respective one of the plurality of stylist profiles.

14. The system of claim 13, wherein the at least one first network page further comprises at least one graphical component that facilitates searching through the plurality of stylist profiles based at least on the plurality of stylist ratings.

15. A computer-implemented method, comprising:
generating, by a client computing device, at least one first user interface comprising an input field to input a description of at least one item a user wishes to purchase and at least one stylist profile selection mechanism to select at least one suggested stylist profile;
receiving as a first input in the client computing device the description of the at least one item;
receiving as a second input in the client computing device a selection of the at least one suggested stylist profile;
sending an item suggestions request that includes the description of the at least one item and the selection of the at least one suggested stylist profile from the client computing device to a server; and
generating, by the client computing device, at least one second user interface from a response to the item suggestions request, the at least one second user interface comprising at least one suggestion from a stylist associated with the at least one suggested stylist profile selected by the user, wherein the at least one suggestion identifies at least one suggested item in a catalog to suggest to the user, the at least one second user interface further comprising a purchase button depicted in association with each of the at least one suggestion and at least one comment field depicted in association with each of the at least one suggestion.

16. The computer-implemented method of claim 15, wherein the at least one suggested stylist profile comprises at least one stylist profile element that describes a plurality of shopping services of the stylist.

17. The computer-implemented method of claim 16, wherein the plurality of shopping services of the stylist relate to a fashion genre.

18. The computer-implemented method of claim 16, wherein the plurality of shopping services of the stylist relate to a human figure shape.

19. The computer-implemented method of claim 15, wherein the at least one suggested item is available for purchase, the method further comprising:
receiving as a third input in the client computing device a selection of the at least one suggested item for purchase by a manipulation of the purchase button; and
sending the selection of the at least one suggested item from the client computing device to the server.

20. The computer-implemented method of claim 15, wherein the at least one suggestion in the at least one second user interface is stored in association with a user account.

21. The computer-implemented method of claim 15, wherein the at least one suggested item is available for purchase through an electronic commerce system.

22. The computer-implemented method of claim 21, further comprising requesting, in the client computing device, at least one third user interface to implement a checkout pipeline to purchase the at least one suggested item.

* * * * *